United States Patent
Namm et al.

(10) Patent No.: US 7,711,383 B2
(45) Date of Patent: May 4, 2010

(54) METHOD AND SYSTEM FOR COMMUNICATING WITHIN A COMMUNICATION NETWORK

(75) Inventors: Joseph C. Namm, Plantation, FL (US); David R. Mills, West Palm Beach, FL (US); John J. Nauful, Forest, VA (US); Clara Sanchez, Davie, FL (US); Jeff D. Smith, Sunrise, FL (US); Donald R. Griffis, Forest, VA (US)

(73) Assignee: Motorola, Inc., Schaumburg, IL (US)

( * ) Notice: Subject to any disclaimer, the term of this patent is extended or adjusted under 35 U.S.C. 154(b) by 691 days.

(21) Appl. No.: 11/428,039

(22) Filed: Jun. 30, 2006

(65) Prior Publication Data

US 2008/0003942 A1    Jan. 3, 2008

(51) Int. Cl.
*H04B 7/00* (2006.01)

(52) U.S. Cl. ................ 455/519; 455/11.1; 455/518

(58) Field of Classification Search ............... 455/7–25, 455/517–521; 370/315–316
See application file for complete search history.

(56) References Cited

U.S. PATENT DOCUMENTS

| 5,758,291 | A | | 5/1998 | Grube et al. | |
|---|---|---|---|---|---|
| 5,857,144 | A | * | 1/1999 | Mangum et al. | 455/11.1 |
| 6,564,066 | B1 | * | 5/2003 | Biggs et al. | 455/512 |
| 6,785,511 | B1 | | 8/2004 | Hengeveld et al. | |
| 2004/0005904 | A1 | * | 1/2004 | Wolf et al. | 455/519 |
| 2006/0041815 | A1 | * | 2/2006 | Haymond | 714/748 |
| 2007/0202910 | A1 | * | 8/2007 | Brewer et al. | 455/521 |

FOREIGN PATENT DOCUMENTS

| WO | 2008005602 A2 | 1/2008 |
|---|---|---|
| WO | 2008005602 A3 | 1/2008 |

OTHER PUBLICATIONS

PCT International PCT Preliminary Report Pplication No. PCT/US07/65038 Dated Jan. 15, 2009—8 Pages.
PCT International PCT Search Report and Written Opinion Application No. PCT/US07/65038 Dated Jan. 7, 2008—8 Pages.

* cited by examiner

*Primary Examiner*—Raymond S Dean
(74) *Attorney, Agent, or Firm*—Barbara R. Doutre

(57) ABSTRACT

A method and system for assigning priority to a talk group of a plurality of talk groups in a communication network (100) is provided. The method includes detecting (304) activity on a first talk group (108) via a Vehicular Repeater (VR) (106). The first talk group is associated with a lower priority than that of a second talk group (110). The method also comprises assigning (306) a higher priority to the first talk group and the lower priority to the second talk group, based on the step of detecting. Further, the method comprises dynamically re-assigning (308) the higher priority and the lower priority amongst the plurality of talk groups, based on detecting activity.

19 Claims, 3 Drawing Sheets

METHOD AND SYSTEM FOR COMMUNICATING WITHIN A COMMUNICATION NETWORK

The present invention generally relates to a communication network, and more particularly, to user talk groups in a communication network.

BACKGROUND OF THE INVENTION

With the growing need for communication and information exchange, communication networks are becoming increasingly important. These communication networks enable users to share resources and communicate among themselves. Examples of communication networks include an Advanced Mobile Phone System (AMPS) network, a Global System for Mobile Communication (GSM) network, a Digital Cellular System (DCS) network, a Code Division Multiple Access (CDMA) network, and a Universal Mobile Telecommunication System (UMTS) network.

Various techniques have been developed to facilitate communication between one or more Portable Subscriber Units (PSUs) within the communication networks. One such system utilizes a Vehicular Repeater (VR) to enable the one or more PSUs to communicate with each other on a talk group. The one or more PSUs can share a communication session collectively on the talk group, using a single channel.

In some situations, multiple talk groups may wish to utilize the available channel simultaneously. For example, in the case of a fire breaking out, the fire department requires communication between the different PSUs allotted to the fire and the water departments that utilize the available channel. Similarly, other agencies such as the police department and rescue services may need the channel for similar communication services.

However, the current VR system does not allow multiple talk groups to utilize the available channel simultaneously. Since there is a single channel available for communication, only one talk group can communicate at a given instance of time. Moreover, when two or more talk groups intend to utilize the available channel for communication, only that talk group is able to communicate that was last using the channel. Hence, there is a need for a method and system that will enable multiple groups of users to communicate by using a single VR.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and to explain various principles and advantages, all in accordance with the present invention.

Figure 1:
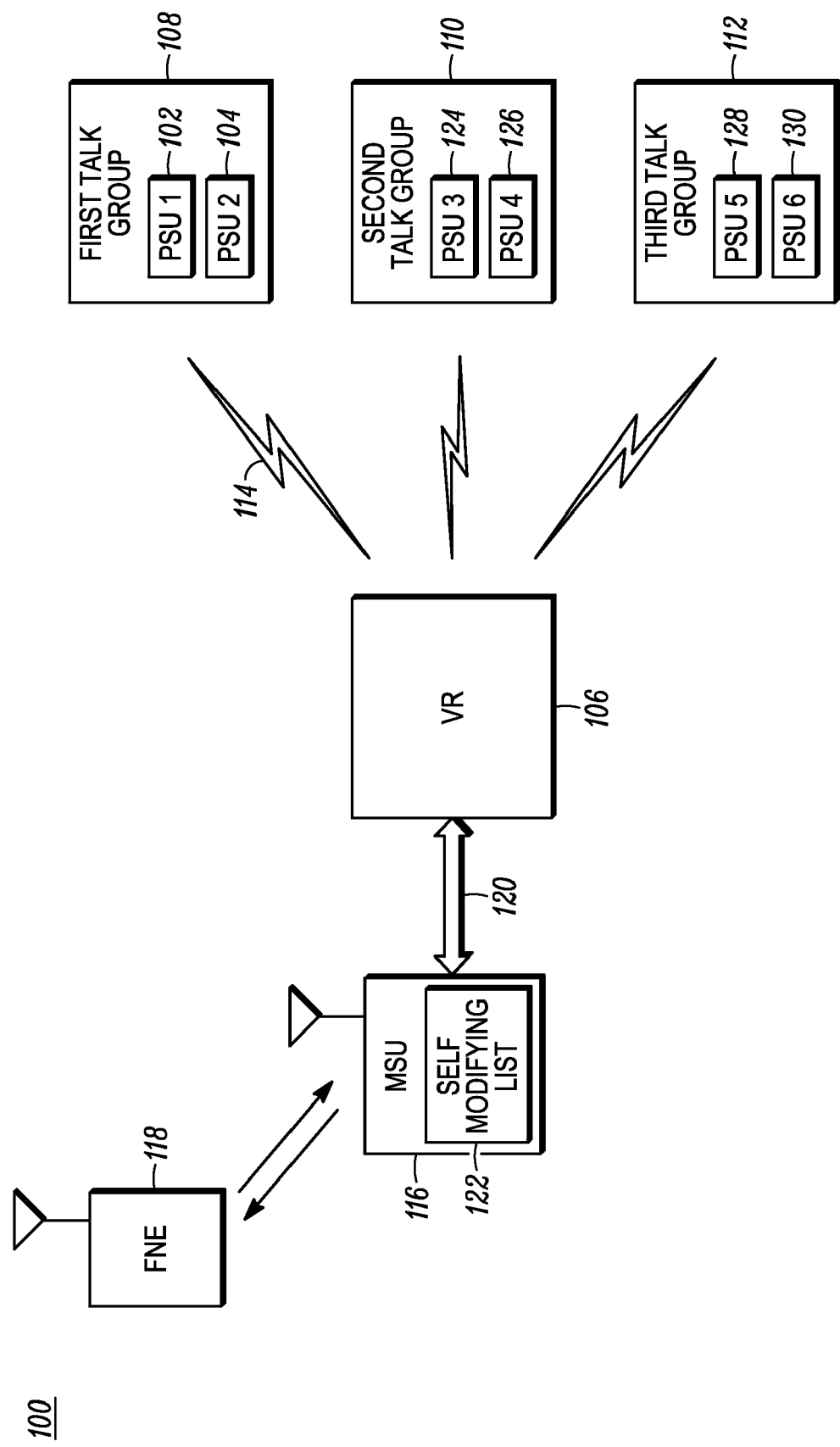
FIG. 1 illustrates an exemplary communication network for assigning priority to a talk group, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for communicating within a wireless communication network, in accordance with various embodiments of the present invention, it should be observed that the present invention resides primarily in combinations of method steps related to assigning priority to a talk group in a communication network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element.

A "set", as used in this document, means a non-empty set, i.e., comprising at least one member. The term "another," as used in this document, is defined as at least a second or more. The terms "includes" and/or "having", as used herein, are defined as comprising.

A method for assigning priority to a talk group of a plurality of talk groups in a communication network is provided, in accordance with the present invention. The method includes detecting an activity on a first talk group via a Vehicular Repeater (VR). The first talk group is associated with a lower priority than a second talk group. Further, the method includes assigning a higher priority to the first talk group and the lower priority to the second talk group, based on the step of detecting the activity. Moreover, the method includes dynamically re-assigning the higher and lower priorities among the plurality of talk groups, based on the detected activity.

Another method for assigning priority to a talk group of a plurality of talk groups in a communication network is provided, in accordance with the present invention. The method includes detecting an activity on a first talk group by using a Vehicular Repeater (VR). The first talk group has a lower priority as compared to the second talk group. The first talk group is associated with a first Portable Subscriber Unit (PSU) and the second talk group with a second PSU. Further, the method includes dynamically assigning a first priority to the first talk group and a second priority to the second talk group. The first priority is higher priority than the second priority. The method further includes dynamically assigning a non-priority to one or more talk groups. The one or more talk groups experience least activities.

A communication network is provided, in accordance with various embodiments of the present invention. The communication network includes fixed network equipment (FNE) as well as a single mobile vehicular repeater (VR). Further, the communication network includes a plurality of Portable Subscriber Units (PSUs) that are capable of communicating with each other via the single mobile VR and the FNE. The plurality of PSUs is divided into different talk groups. Moreover, the communication network includes a mobile subscriber unit (MSU) that is connected to the single mobile VR. The MSU maintains a self-modifying list for assigning and varying priorities among the different talk groups, for communication over the single VR and the FNE.

FIG. 1 illustrates an exemplary communication network 100 for assigning priority to a talk group, in accordance with various embodiments of the present invention. The communication network 100 facilitates communication between a plurality of Portable Subscriber Units (PSUs), for example, a PSU 102 and a PSU 104, using a Vehicular Repeater (VR) 106. Examples of the communication network 100 include, but are not limited to, an Advanced Mobile Phone System (AMPS) network, a Global System for Mobile Communications (GSM) network, a Digital Cellular System (DCS) network, a Code Division Multiple Access (CDMA) network, and a Universal Mobile Telecommunications Systems (UMTS) network.

A VR 106, installed in a vehicle, includes a receiving antenna, which receives a signal from FNE 118, amplifies the signal, and sends the amplified signal to a transmitting antenna. The transmitting antenna then sends the amplified signal to the portable unit registered with the VR, thereby enabling the portable unit to maintain continuous communication. The VR 106 facilitates communication between the plurality of PSUs on one or more talk groups, for example, a first talk group 108. A talk group is a group of PSUs that share a communication session collectively. For example, the PSU 102 can initiate a group-voice request on the talk group 108. The other PSUs registered on the talk group 108, for example, the PSU 104, can receive the group-voice request and start communicating with the PSU 102. The plurality of talk groups is shown to include the first talk group 108, a second talk group 110, and a third talk group 112. Further, for illustrative purposes, only three talk groups are shown in FIG. 1. However, the number of talk groups and the PSUs associated with each talk group may vary, in accordance with different embodiments of the invention. The PSUs associated with each talk group can communicate with each other through the VR 106 by using a conventional communication link 114.

The communication network 100 also includes a Mobile Subscriber Unit (MSU) 116 and Fixed Network Equipment (FNE) 118. The FNE 118 authorizes and updates the registration information pertaining to each PSU associated with the plurality of talk groups. Further, the FNE 118 registers the MSU 116 and is affiliated with the communication network 100. The registration and affiliation of the MSU 116 with the FNE 118 is further explained with reference to a FIG. 4. Moreover, the authorization and registration of the PSUs associated with the plurality of talk groups is also explained in FIG. 4. For an embodiment of the present invention, the MSU 116 is also connected to an MSU control head through a Synchronous Serial Interface (SSI) or a Controller Area Network (CAN) bus. The MSU control head can control the functioning of the MSU 116.

The MSU 116 can be connected to the VR 106 through an Extended Control and Management Protocol (XCMP) interface 120 over RS-232. The XCMP interface 120 is used to allow the VR 106 to control the operation of the PSU 102. Further, the XCMP interface 120 defines control and status messages that can be exchanged between the PSU 102 the VR 106 to affect the operations of the PSU 102. For an embodiment of the present invention, the interface between the VR 106 and the MSU 116 can be a Motorola Audio Signaling Protocol (MASP) interface. The MASP is used to transfer encoded audio and some control messages between the MSU 116 and the VR 106. The MSU 116 stores the registration information pertaining to the plurality of PSUs associated with the plurality of talk groups in the communication network 100. Further, the MSU 116 maintains a self-modifying list 122. The self-modifying list 122 is used to assign and vary priorities among the different talk groups.

For an embodiment of the present invention, the self-modifying list is based on the registration of the identity of a PSU and the talk group associated with the MSU 116. The MSU 116 updates the self-modifying list by storing the registration information and prioritizing the registered talk groups. The MSU 116 assigns the highest priority to the most recently active talk group. Therefore, if a talk group receives an activity, it automatically gets the first priority in the self-modifying list 122. For example, initially, the first talk group is assigned a first priority and the second talk group is assigned a second priority. On detecting an activity, for example, voice traffic on the second talk group, the self-modifying list updates itself by assigning a first priority to the second talk group and the second priority to the first talk group. However, during periods of complete inactivity, the MSU 116 retains the latest priority assignments of the talk groups, and assigns the non-priority to the remaining talk groups until new activity occurs in one of the plurality of talk groups.

Figure 2:
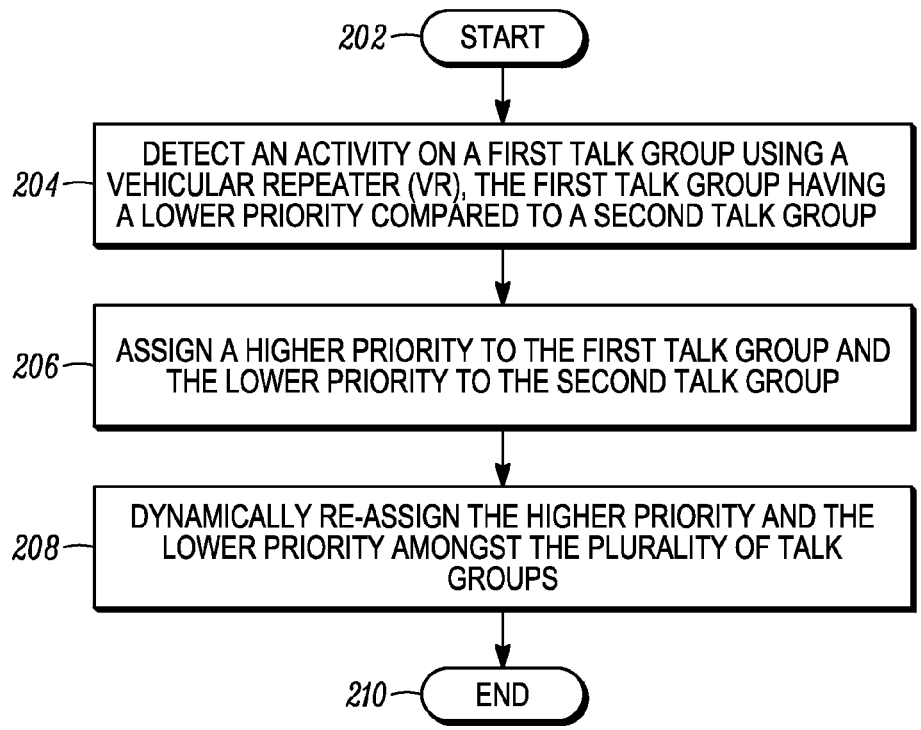
FIG. 2 is a flow diagram illustrating a method for assigning priority to a talk group in a communication network, in accordance with various embodiments of the present invention.

FIG. 2 is a flow diagram illustrating a method for assigning priority to a talk group in the communication network 100, in accordance with various embodiments of the present invention. The method starts at step 202. At step 204, the VR 106 detects an activity on the first talk group 108. For exemplary purposes, let us consider that the first talk group 108 is associated with a lower priority than that of the second talk group 110. The priority assignment and variation are maintained by the MSU 116. The MSU 116 maintains a self-modifying list 122 to keep a record of priority assigned to one or more talk groups of the plurality of talk groups.

At step 206, a higher priority is assigned to the first talk group 108 and the lower priority to the second talk group 110, based on the step of detecting the activity. For an embodiment of the present invention, the MSU 116 assigns the higher priority to a talk group associated with the PSU 102 when the PSU 102 registers with the VR 106. For an embodiment of the present invention, the PSU 102 registers with the VR 106 prior to initiating an activity. The PSU 102 can register with the VR 106 by using the registration information. The registration information may include the PSU identification information and the information pertaining to a talk group. The talk-group information can include information related to the other PSUs registered with the talk group. Based on the registration, the MSU 116 assigns the higher priority to the first talk group 108 associated with the PSU 104 in the self-modifying list 122.

For another embodiment of the present invention, the MSU 116 assigns a non-priority to one or more talk groups of the plurality of talk groups that experience a decrease in activity, as compared to the most active talk group. For example, the first talk group 108 may be the most active talk group and the talk group 112 may experience least activity, as compared to the first talk group 108. Therefore, the MSU 116 will automatically assign a non-priority to the talk group 112.

For an embodiment of the present invention, the VR 106 may detect a receive activity on a non-priority talk group, for example, the talk group 112. For example, when the MSU 116 detects a receive activity from a non-priority talk group 112, a new priority is assigned to the non-priority talk group 112.

The new priority of the non-priority talk group 112 can be the second priority. Further, the MSU 116 re-assigns the first priority to the second talk group 110, when a communication session is active at the second talk group 112.

At step 208, the MSU 116 dynamically re-assigns the higher and lower priorities among the plurality of talk groups, based on the activity on each talk group. For example, the current priorities assigned to the three talk groups are a first priority, a second priority, and a non-priority, respectively. Until any of the three talk groups is engaged in an activity, the MSU 116 maintains the same priority for all the talk groups. However, subsequent activity on the lower priority talk group, or the non-priority talk group, changes the priorities of the talk groups in the self-modifying list. For an embodiment of the present invention, the MSU 116 automatically assigns the higher priority to any talk group that is involved in an emergency communication session. For example, an emergency call is detected on the second talk group 110, and simultaneously an activity is detected on the higher priority talk group, i.e., the first talk group 108. In this event, the MSU 116 identifies the second talk group 110 as the higher priority talk group and modifies the self-modifying list accordingly. The process terminates at step 210.

Figure 3:
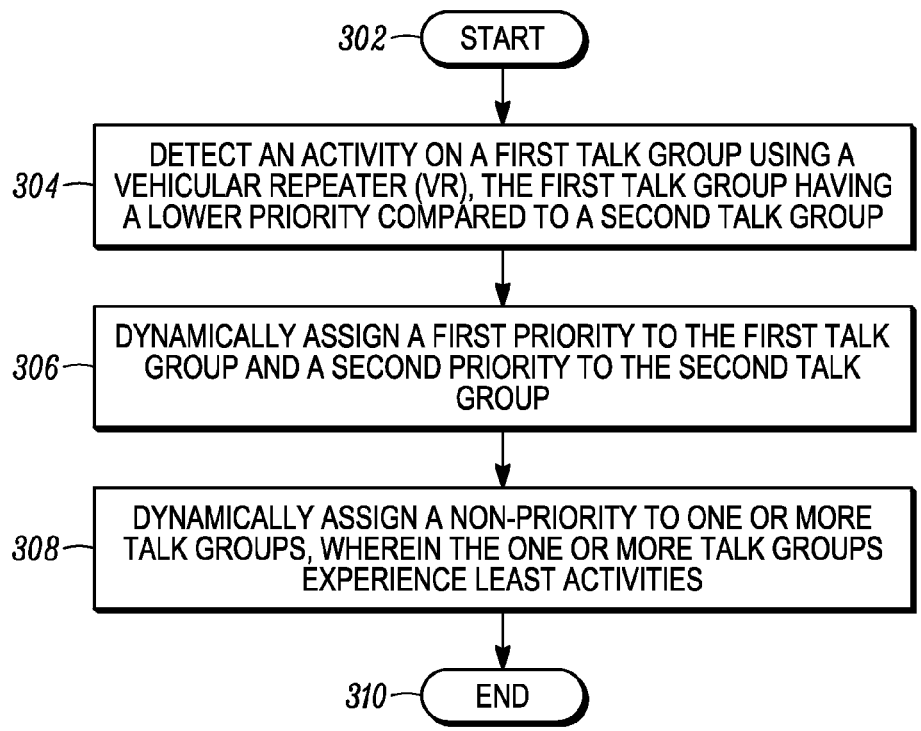
FIG. 3 is a flow diagram illustrating a method for assigning priority to a talk group within a communication network, in accordance with an embodiment of the present invention.

FIG. 3 is a flow diagram illustrating a method for assigning priority to a talk group within the communication network 100, in accordance with an embodiment of the present invention. The method starts at step 302. At step 304, the VR 106 detects an activity on the first talk group 108. The first talk group 108 is associated with the first PSU 104, and the second talk group 110 is associated with the second PSU 124. The first talk group 108 has a lower priority as compared to that of the second talk group 110.

For an embodiment of the present invention, the PSU 102 and the PSU 104 register with the VR 106 prior to the detection of any activity. The talk group associated with the PSU is assigned a first priority when the PSU registers with the VR 106 by using registration information. The registration information can be a PSU-identification information and information pertaining to at least one talk group.

At step 306, the MSU 116 dynamically assigns a first priority to the first talk group 108 and a second priority to the second talk group 110, on detecting activity in the first talk group 108. The first priority is higher than the second. For an embodiment of the present invention, the activity can include receiving voice traffic associated with the first talk group 108 at the PSU.

At step 308, the MSU dynamically assigns a non-priority to one or more talk groups that are experiencing least activities. For an embodiment of the present invention, the VR 106 detects an activity on one of the one or more talk groups experiencing least activities, for example, the third talk group 112. Further, the MSU 116 assigns the second priority to the third talk group 112 when a communication session is active at the first talk group 108.

The priority assignment of the talk groups is maintained by the MSU 116 by using a self-modifying list. This self-modifying list can be modified dynamically, based on the detection of an activity on the talk groups. For an embodiment of the present invention, the MSU 116 moves the talk group to the first priority position in the self-modifying list when voice activity is detected on a talk group. Further, the MSU 116 shifts the previous first priority talk group to the second priority position, and the previous second priority talk group to a non-priority position in the self-modifying list. For an embodiment of the present invention, the MSU 116 dynamically assigns priorities to the talk groups, based on their registration with the VR 106 when no activity is detected on the talk groups. The talk group associated with the last PSU registering with the VR 106 is assigned the first priority, while the talk group associated with the penultimate registered PSU is assigned the second priority.

For an embodiment of the present invention, the MSU 116 assigns the first priority to the second talk group when an emergency communication session is received on the second talk group. For example, the second talk group 110 receives an emergency communication session on one of the PSUs associated with the second priority talk group 110. In such a scenario, the second talk group 110 is automatically assigned a first priority in the self-modifying list 122. Further, the first talk group 108, which was previously assigned a first priority, is assigned a second priority in the self-modifying list 122. The MSU 116 maintains the third talk group 112 at non-priority. The process terminates at step 310.

Figure 4:
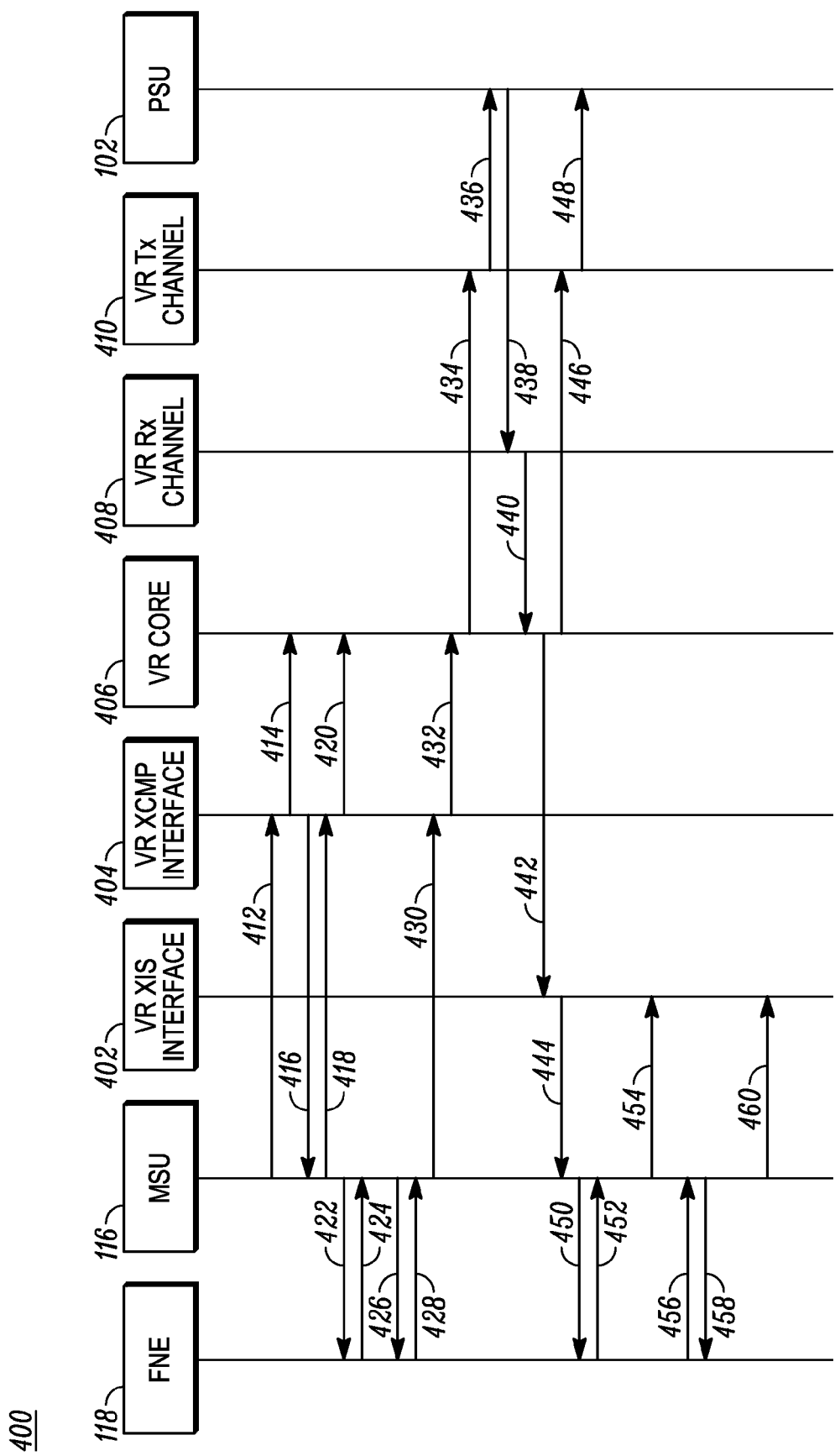
FIG. 4 is a call-flow diagram illustrating the method for communicating within a communication network, where various embodiments of the present invention can be practiced.

FIG. 4 is a call-flow diagram illustrating the method for communicating within a communication network 100, where various embodiments of the present invention can be practiced. Although the call-flow diagram 400 will be discussed with reference to FIG. 1, it should be understood that the call-flow diagram 400 can be implemented with reference to any other suitable embodiment of the invention. Further, the call-flow diagram 400 can contain a greater or fewer numbers of steps than those shown in FIG. 4. Moreover, the call-flow diagram 400 is shown to include the MSU 116, the FNE 118, a VR XIS interface 402, a Vehicular Repeater System XCMP (VRS XCMP) interface 404, a VR core 406, a VR receiver channel 408, a VR transmitter channel 410, and the PSU 102. The VR receiver channel 408 and the VR transmitter channel 410 are utilized by the VR 106 for receiving and transmitting the signals over a conventional communication link 114.

For an embodiment of the present invention, a signal 412 originates from the MSU 116, indicating that the MSU 116 is powered on. The MSU 116 sends the signal 412 to the VR XCMP interface 404. The VR XCMP interface 404 confirms the power-on status of the MSU 116 by sending a MSU Power on signal 414 to the VR core 406. A signal 416, representing the power-on status of MSU 116, is evoked at the VR XCMP interface 404 and passed on to the MSU 116. In response to the signal 416, a signal 418 originates from the MSU 116 and is sent to the VR XCMP interface 404. Thereafter, the MSU 116 is ready to receive and send signals from and to the other network entities. The MSU 116-ready status is sent from the VR XCMP interface 404 to the VR core 406 by using a signal 420.

For an embodiment of the present invention, when the MSU 116 is ready, it communicates on a Project 25 (P25) trunked mode. P25 is a suite of standards for digital radio communication, for the use of safety agencies, to enable them to communicate with other agencies and mutual-aid response teams in the event of an emergency. A signal 422 pertaining to a request for the registration of the MSU 116 with the FNE 118 originates from the MSU 116. In response to the signal 422, the FNE 118 sends a signal 424 to the MSU 116, to confirm the registration of the MSU 116 with the FNE 118. After the registration is confirmed, the MSU 116 affiliates with the FNE 118. Further, the MSU 116 sends a signal 426 to the FNE 118. The signal 426 represents a group-affiliation request for affiliation of the MSU identity to a particular talk group. After the signal 426 is received, the FNE 118 responds by sending a signal 428 to the MSU 116. The signal 428 confirms the affiliation of the talk group with the FNE 118. Thereafter, the MSU 116 can start communication with the talk group.

After the MSU 116 is affiliated to the talk groups, the VR 106 is enabled to communicate by using the MSU 116. The MSU 116 sends a signal 430 to the VR XCMP interface 404. The signal 430 represents the VR-enabled status of the VR 106 conveyed to the VR XCMP interface 404. The VR XCMP interface 404 forwards the VR-enabled status to the VR core 406 by using a signal 432. A signal 434 representing the registration request for the PSU 102 is sent from the VR core 406 to the VR transmitter channel 410. The VR transmitter channel 410 also transmits the registration request through a signal 436 to the PSU 102. In response to the signal 436, the PSU 102 sends a signal 438 to the VR receiver channel 408. The signal 438 represents a VR-registration trunk-block signal 438. The VR-registration trunk-block signal 438 includes the information pertaining to the registration and affiliation of the PSU 102 with the FNE 118. This information includes the PSU's identity and information of the talk group that the user would like to be affiliated to. The VR receiver channel 408 receives the signal and sends a signal 440 to the VR core 406. The signal 440 represents the VR registration trunk block. The VR-registration trunk-block signal 438 is also forwarded by the VR core 406 to the VR XIS interface 402 through a signal 442. Further, the VR XIS interface 402 sends the VR-registration trunk-block signal 438 to the MSU 116 through a signal 444 by using the XIS interface.

At the same time, a signal 446 originates from the VR core 406 and is sent to the VR transmitter channel 410. The signal 446 represents the acknowledgement of VR 106 at the FNE 118. The VR transmitter channel 410 also forwards the acknowledgment of the VR 106 at the FNE 118 through a signal 448 to the PSU 102. For an embodiment of the present invention, the plurality of PSUs can send their respective registration information to the VR 106. For an embodiment of the present invention, the plurality of PSUs can send their registration information in discrete time slots, for example, as in the slotted Aloha protocol. (Aloha is a computer-networking protocol that uses a shared medium for the transmission of voice and data.) The details pertaining to the slotted Aloha protocol can be found in a research paper titled 'Aloha Packet System with and without Slots and Capture', published by the Association for Computing Machinery Special Interest Group on Data Communications (ACM SIGCOMM), *Computer Communication Review*, Volume 5, Issue 2, pp. 28-42, 1975. It will be appreciated that the research paper titled 'Aloha Packet System with and without Slots and Capture' is included herein by reference and should not be construed to alter the scope of this invention.

At the same time, the MSU 116 sends a signal 450 to make a request for the registration of the PSU 102 with the FNE 118. In response to the signal 450, the FNE 118 sends a signal 452 to the MSU 116, confirming the registration and affiliation of the PSU 102 with the FNE 118 using the talk group requested by the PSU 102. After the registration is confirmed, the MSU 116 forwards the registration response of the PSU 104 to the VR XIS interface 402 through a signal 454. For an embodiment of the present invention, the MSU 116 forwards the registration response of the plurality of PSUs to the VR XIS interface 402. For an embodiment of the present invention, on receiving the registration response of the plurality of PSUs, the MSU 116 can create a list of the plurality of PSUs that make registration requests to the VR 106. For an embodiment of the present invention, the registration information of the plurality of PSUs may include the PSU identity, the talk group associated with each PSU, and the status information.

The MSU 116 sends a signal 456 to represent a request for the affiliation of the talk group associated with the PSU 102 with the FNE 118. In response to the signal 456, the FNE 118 sends a signal 458 to the MSU 116, confirming the affiliation of the PSU 102 with the FNE 118. The affiliation response of the talk groups is sent to the VR XIS interface 402 by using a signal 460. For an embodiment of the present invention, the MSU 116 maintains an affiliation table that enables the MSU 116 to route those activities to the PSUs that have been accepted by the FNE 118 as valid. For another embodiment of the present invention, the sequence of steps from the signal 450 to the signal 460 is exchanged until each PSU of the plurality of PSUs is registered and affiliated with the FNE 118.

Various embodiments of the method and system for assigning priority to a talk group of the plurality of talk groups in a communication network have been described above. Various embodiments of the present invention have significant advantages over methods and systems that exist to enable communication among various PSUs by using a VR. When multiple talk groups attempt communication simultaneously by using the VR, this communication does not occur because of the availability of only a single channel for communication. However, the present invention enables multiple talk groups to communicate by using the single VR, based on the priority assigned to the talk groups. This ensures smooth and continuous communication on multiple talk groups, utilizing the single VR. Moreover, in the event of a talk group being engaged in an emergency communication session, the VR enables the talk group to utilize the channel, irrespective of the priority assigned to the talk group.

It will be appreciated that the method and system for communicating within a wireless communication system described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to assign priority to talk groups in a communication network. Alternatively, some or all the functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims as issued.

What is claimed is:

1. A method for assigning a priority to a talk group of a plurality of talk groups in a communication network, comprising the steps of:
   detecting voice traffic activity on a first talk group via a Vehicular Repeater (VR), the first talk group being associated with a lower priority than a second talk group;
   assigning a higher priority to the first talk group and the lower priority to the second talk group based on the step of detecting; and
   dynamically re-assigning the higher priority and the lower priority amongst the plurality of talk groups based on detecting the voice traffic activity.

2. The method as recited in claim 1 further comprising a prior step of registering a portable subscriber unit (PSU) with the VR.

3. The method as recited in claim 2 further comprising assigning the higher priority to a talk group associated with the PSU when the PSU registers with the VR.

4. The method as recited in claim 2, wherein the PSU registers with the VR using registration information comprising a PSU identification information and one talk group information.

5. The method as recited in claim 1 further comprising assigning a non-priority to one or more talk groups of the plurality of talk groups experiencing a decrease in the voice traffic activity relative to the most active talk group.

6. The method as recited in claim 5 further comprising the steps of:
   detecting receive voice traffic activity on one of the non-priority talk groups;
   assigning the lower priority to previously non-priority talk group;
   re-assigning the higher priority to the first talk group; and
   re-assigning the non-priority to the previously lower priority talk group.

7. The method as recited in claim 1 further comprising automatically assigning the higher priority to any talk group involved in an emergency communication session.

8. A method for assigning a priority to a talk group of a plurality of talk groups in a communication network, comprising the steps of:
   detecting voice traffic activity on a first talk group using a Vehicular Repeater (VR), the first talk group having a lower priority compared to a second talk group, wherein the first talk group is associated with a first Portable Subscriber Unit (PSU) and the second talk group is associated with a second PSU;
   dynamically assigning a first priority to the first talk group and a second priority to the second talk group, wherein the first priority is higher than the second priority; and
   dynamically assigning a non-priority to one or more talk groups, wherein the one or more talk groups experience least voice traffic activities.

9. The method as recited in claim 8 further comprising a prior step of registering a PSU with the VR.

10. The method as recited in claim 9 further comprising assigning the first priority to a talk group associated with the PSU when the PSU registers with the VR.

11. The method as recited in claim 9, wherein the PSU registers with the VR using registration information selected from a group comprising a PSU identification information and at least one talk group information.

12. The method as recited in claim 8 further comprising the steps of:
   detecting voice traffic activity on a talk group of the one or more talk groups; and
   assigning the second priority to the talk group of the one or more talk groups when a communication session is active at the first talk group.

13. The method as recited in claim 8 further comprising assigning the first priority to the second talk group when an emergency communication session is received on the second talk group.

14. A communication network, comprising:
   a fixed network equipment (FNE);
   a single mobile Vehicular Repeater (VR);
   a plurality of Portable Subscriber Units (PSUs) capable of communicating with each other via the single mobile VR and the FNE, the plurality of PSUs divided into different talk groups; and
   a mobile subscriber unit (MSU) connected with the single mobile VR, wherein the MSU maintains a self-modifying list for assigning and varying priority amongst the different talk groups based on detecting voice traffic activity on at least one talk group for communication over the single VR and the FNE.

15. The communication network as recited in claim 14, wherein the self-modifying list is based on a registration of a PSU's identity and talk group with the MSU.

16. The communication network as recited in claim 15, wherein the MSU updates the self-modifying list by storing the registration information and prioritizing the registered talk group.

17. The communication network as recited in claim 14, wherein the MSU prioritizes most recently active talk groups.

18. The communication network as recited in claim 14, wherein the MSU, during complete non-activity, retains the latest priority assignments and assigns non-priority to remaining talk groups until new voice traffic activity occurs.

19. The communication network as recited in claim 14, wherein the self-modifying list prioritizes the different talk-groups based on a first priority, a second priority and a non-priority, and wherein:
   a receive voice traffic activity at a PSU moves a non-priority talk group into the second priority;
   a talk group previously assigned the second priority is then re-assigned to non-priority; and wherein:
   a transmit voice traffic activity from a PSU moves the priority of the non-priority talk group to the first priority.

* * * * *

UNITED STATES PATENT AND TRADEMARK OFFICE
CERTIFICATE OF CORRECTION

| | | |
|---|---|---|
| PATENT NO. | : 7,711,383 B2 | Page 1 of 1 |
| APPLICATION NO. | : 11/428039 | |
| DATED | : May 4, 2010 | |
| INVENTOR(S) | : Namm et al. | |

It is certified that error appears in the above-identified patent and that said Letters Patent is hereby corrected as shown below:

ON THE TITLE PAGE

1. On the Face Page, in Field (56), under "OTHER PUBLICATIONS", in Column 2, Line 1, delete "Pplication" and insert -- Application --, therefor.

IN THE CLAIMS

2. In Column 10, Line 33, in Claim 14, delete "single VR" and insert -- single mobile VR --, therefor.

3. In Column 10, Line 55, in Claim 19, delete "from a" and insert -- from the --, therefor.

Signed and Sealed this
Eighth Day of November, 2011

David J. Kappos
*Director of the United States Patent and Trademark Office*